(12) United States Patent
Das Sharma

(10) Patent No.: US 10,606,790 B2
(45) Date of Patent: Mar. 31, 2020

(54) PRECODING MECHANISM IN PCI-EXPRESS

(71) Applicant: Intel Corporation, Santa Clara, CA (US)

(72) Inventor: Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/143,182

(22) Filed: Sep. 26, 2018

(65) Prior Publication Data

US 2019/0095380 A1 Mar. 28, 2019

Related U.S. Application Data

(60) Provisional application No. 62/658,218, filed on Apr. 16, 2018.

(51) Int. Cl.
*G06F 13/42* (2006.01)
*G06F 13/40* (2006.01)

(52) U.S. Cl.
CPC ...... *G06F 13/4282* (2013.01); *G06F 13/4072* (2013.01); *G06F 2213/0024* (2013.01); *G06F 2213/0026* (2013.01)

(58) Field of Classification Search
CPC ..... G11B 20/1009; G11B 5/09; H04L 5/0048; H04L 1/0027; H04N 9/8042
USPC ......... 360/51; 386/E9.013, E5.052; 370/329; 714/755, 701
See application file for complete search history.

(56) References Cited

U.S. PATENT DOCUMENTS

| | | | | |
|---|---|---|---|---|
| 6,147,826 A | * | 11/2000 | Hashimura | G11B 5/012 360/46 |
| 6,301,066 B1 | * | 10/2001 | Uno | G11B 20/10009 360/45 |
| 2002/0154430 A1 | * | 10/2002 | Rae | G11B 5/09 360/25 |
| 2003/0035236 A1 | * | 2/2003 | Satoh | G11B 5/035 360/65 |
| 2016/0373223 A1 | * | 12/2016 | Quick, Jr. | H04B 17/336 |
| 2018/0322042 A1 | * | 11/2018 | Jang | G06F 12/0246 |

* cited by examiner

*Primary Examiner* — Faisal M Zaman
(74) *Attorney, Agent, or Firm* — Schwabe, Williamson & Wyatt, P.C.

(57) ABSTRACT

In embodiments, an apparatus for serial communication includes a transceiver, to receive a precoding request from a downlink receiver across a serial communication link, and to transmit data bits to the downlink receiver over the serial communication link. In embodiments, the apparatus further includes a precoder, coupled to the transceiver, to: receive scrambled data bits of a subset of the data bits to be transmitted, from a coupled scrambler, and, in response to the request from the downlink receiver, precode the scrambled data bits, and output the precoded scrambled data bits to the transceiver, for transmission to the downlink receiver across the serial communication link together with other unscrambled data bits.

25 Claims, 7 Drawing Sheets

PRECODING MECHANISM IN PCI-EXPRESS

CROSS REFERENCE TO RELATED APPLICATIONS

The present application claims priority to U.S. Provisional Patent Application No. 62/658,218, filed Apr. 16, 2018, entitled "PRECODING MECHANISMS FOR DEVICES COUPLED BY A COMPUTER BUS," the entire disclosure of which is hereby incorporated by reference in its entirety for all purposes, except for those sections, if any, that are inconsistent with this specification.

FIELD

The present invention relates to the field of computing, and, in particular, to precoding data bits to be transmitted to a receiver on a serial interface, e.g., over a peripheral component interface-express (PCIe) link.

BACKGROUND

As data rates increase, serial communications links continue to push circuit settings. In receivers with decision feedback equalizer (DFE) settings that have larger values, certain data patterns, such as, for example, alternating 1s and 0s, are susceptible to error propagation on a single bit flip, which is not uncommon. If a single bit flip does occur during transmission of such a sequence, it may then manifest as a contiguous error burst and cause potential data corruption due to cyclic redundancy code (CRC) aliasing.

DETAILED DESCRIPTION

Figure 1:
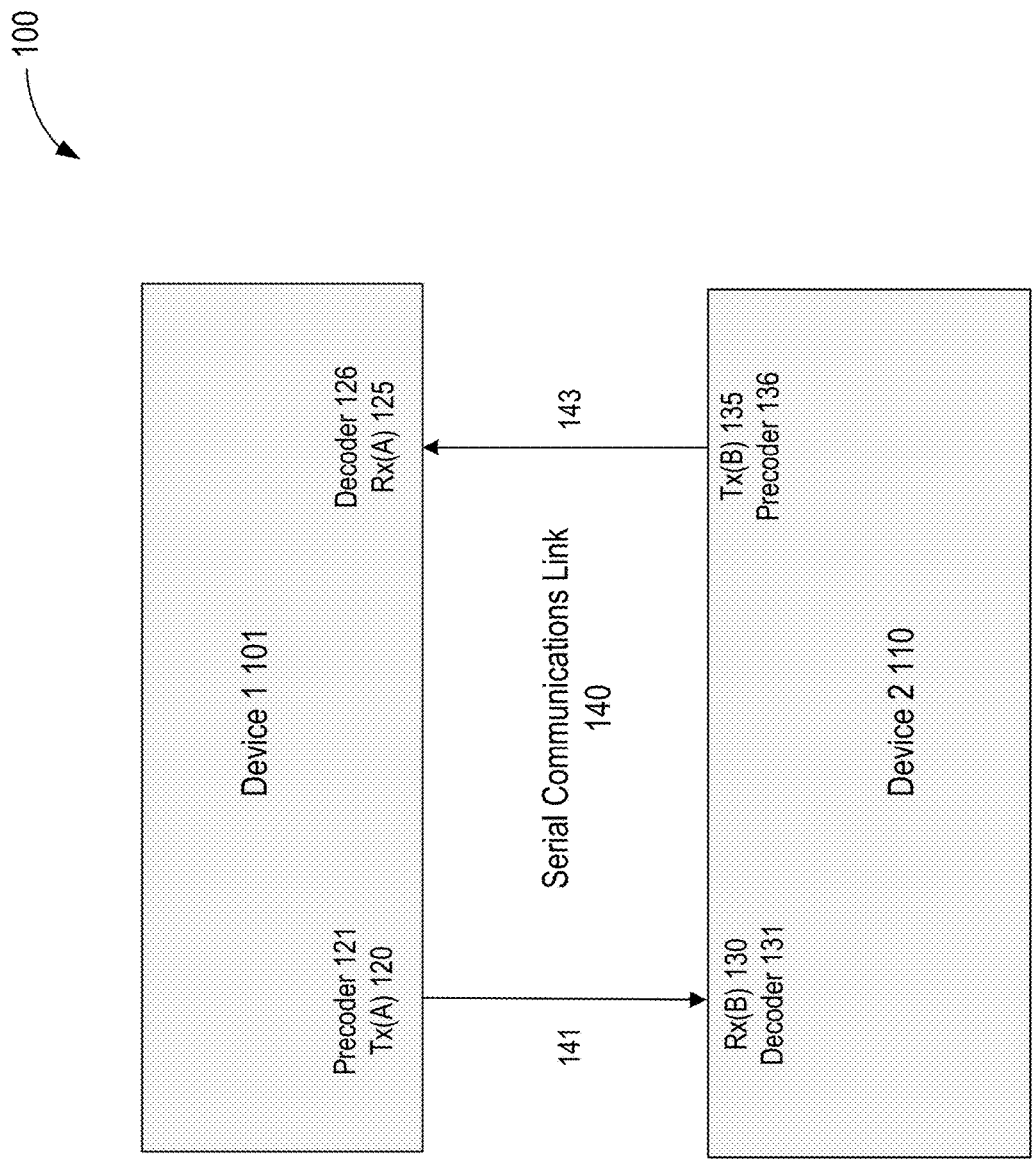
FIG. 1 is a block diagram of an example transmitter and an example receiver connected by an example serial communications link, in accordance with various embodiments.

In embodiments, an apparatus for serial communication includes a transceiver to receive a precoding request from a downlink receiver across a serial communication link, and to also transmit data bits to the downlink receiver over the serial communication link. In embodiments, the apparatus further includes a precoder, coupled to the transceiver, to receive scrambled data bits of a subset of the data bits to be transmitted from a coupled scrambler, and, in response to the request from the downlink receiver, precode the scrambled data bits. In embodiments, the precoded scrambled data bits are output to the transceiver, for transmission to the downlink receiver, together with other data bits that are not scrambled, across the serial communication link.

In embodiments, a circuit card for computing includes a transceiver to receive a precoding request from a downlink receiver external to the circuit card, across PCIe link, and a scrambler, to scramble a subset of a plurality of data bits to be transmitted to the downlink receiver over the PCIe link. In embodiments, the transceiver, in response to the request from the downlink receiver, is to further precode the scrambled data bits, and transmit the precoded scrambled data bits to the downlink receiver together with unscrambled data bits.

In embodiments, a system includes a first circuit component having a downlink receiver to send a precoding request to an uplink transmitter of a second circuit component across a serial communication link during back-channel based transmitter equalization, and a second circuit component having the uplink transmitter, to receive the precoding request from, and transmit data bits to, the downlink receiver, across the serial communication link. In embodiments, the transmitter scrambles a subset of data bits to be transmitted, of a pre-defined type, and wherein, in response to the request from the downlink receiver, the transmitter precodes the scrambled data bits, and transmits them to the downlink receiver, together with other unscrambled data bits, across the serial communication link.

In the description to follow, reference is made to the accompanying drawings which form a part hereof wherein like numerals (or, as the case may be, the last two digits of an index numeral) designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used hereinafter, including the claims, the term "computing platform" may be considered synonymous to, and may hereafter be occasionally referred to, as a computer device, computing device, client device or client, mobile, mobile unit, mobile terminal, mobile station, mobile user, mobile equipment, user equipment (UE), user terminal, machine-type communication (MTC) device, machine-to-machine (M2M) device, M2M equipment (M2ME), Internet of Things (IoT) device, subscriber, user, receiver, etc., and may describe any physical hardware device capable of sequentially and automatically carrying out a sequence of arithmetic or logical operations, equipped to record/store data on a machine readable medium, and transmit and receive data from one or more other devices in a communications network. Furthermore, the term "computing platform" may include any type of electronic device, such as a cellular phone or smartphone, a tablet personal computer, a wearable computing device, an autonomous sensor, personal digital assistants (PDAs), a laptop computer, a desktop personal computer, a video game console, a digital media player, an in-vehicle infotainment (IVI) and/or an in-car entertainment (ICE) device, an in-vehicle computing system, a navigation system, an autonomous driving system, a vehicle-to-vehicle (V2V) communication system, a vehicle-to-everything (V2X) communication system, a handheld messaging device, a personal data assistant, an electronic book reader, an augmented reality device, and/or any other like electronic device.

As used hereinafter, including the claims, the term "link" or "communications link" may refer to any transmission medium, either tangible or intangible, which is used to communicate data or a data stream. Additionally, the term "link" may be synonymous with and/or equivalent to "communications channel," "data communications channel," "transmission channel," "data transmission channel," "access channel," "data access channel," "channel," "data link," "radio link," "carrier," "radiofrequency carrier," and/or any other like term denoting a pathway or medium through which data is communicated.

As used hereinafter, including the claims, the terms "scrambler", "precoder", "decoder", "descrambler", "transceiver", "transmitter" and/or "receiver" may refer to, be part of, or include one or more Application Specific Integrated Circuits (ASIC), electronic circuits, programmable combinational logic circuits (such as field programmable gate arrays (FPGA)) programmed with logic to perform operations described herein, a processor (shared, dedicated, or group) and/or memory (shared, dedicated, or group) that execute one or more software or firmware programs generated from a plurality of programming instructions with logic to perform operations described herein, and/or other suitable components that provide the described functionality.

As used hereinafter, including the claims, the terms "uplink" or "upstream" and "downlink" or "downstream" are relative terms, referring to entities, components or devices connected across a serial communications link, such as, for example, a PCIe link, where an "uplink" device transmits data to a "downlink" device. Devices described below that are connected across a serial communications link include both transmitters and receivers. Thus, a link connects two components or devices—it is two unidirectional links—one called "uplink" and the other "downlink."

For example, a given central processing unit (CPU) may connect to a storage device. The CPU transmitting data to the storage device is said to be "downlink" where the CPU transmits (Tx) and the storage device receives (Rx). Thus, the CPU's Tx and the storage device's Rx form the downlink. In the other direction, (storage device to CPU) side, which is a different set of wires/pins than the CPU to storage device downlink, the storage device transmits (Tx) and the CPU receives (Rx), and in this case the storage device is "uplink" from the CPU. Thus, each device has a receiver and a transmitter, each for a different direction, and a first device may be "uplink" relative to a second device when it is transmitting data to the second device, but then also "downlink" from the second device when the second device is transmitting data to it, the first device.

In embodiments, as described below in detail, a request is made by a Rx on one device to its corresponding Tx on another device, as to whether to turn on the precoding or not. So precoding may be on in the uplink but not on the down link, or may be vice-versa, or may be on in both directions, or off in both directions. In actuality, in embodiments, a receiver sends a precoding request to its "link partner" so that the transmitter of the "link partner" can turn on the precoding.

Additionally, because the devices described below include both transmitters and receivers, they may sometimes be referred to, including in the claims, as "transceivers." A transceiver is the Tx+Rx in a device. So, in the example provided above, the CPU's Tx and Rx form its transceiver and the device's Tx and Rx form its own transceiver. It is further understood that when a transmitter is said to "receive a request form a downlink receiver" it is a receiver element of such a device, that is coupled to the transmitter, that actually receives the request from the downlink receiver, and communicates it internally, within the device, to the transmitter. In what follows, including in the claims, for ease of description, this set of communications may often be referred to as the "transmitter receiving a request for precoding from a downlink receiver", or a transmitter to "in response to the request from the downlink receiver, precode the scrambled data bits", or "a receiver sending a request for precoding to a transmitter", it being understood that in all such cases the transmitter actually receives the request via a receiver of its own device or component.

In embodiments, an uplink transmitter connected across a serial communications link to a downlink receiver precodes only scrambled bits of a data bit transmission based on the downlink receiver's request during back-channel based transmitter equalization. In embodiments, the downlink (and/or uplink) receiver may request precoding during equalization, depending on its destination feedback equalizer (DFE) set-up. In embodiments, the criteria used by the receiver to request (or not to request) precoding may be its DFE set-up, such as for example a higher ratio of H1 to H0 (i.e., the prior bit has a high impact on the current bit).

Figure 3:
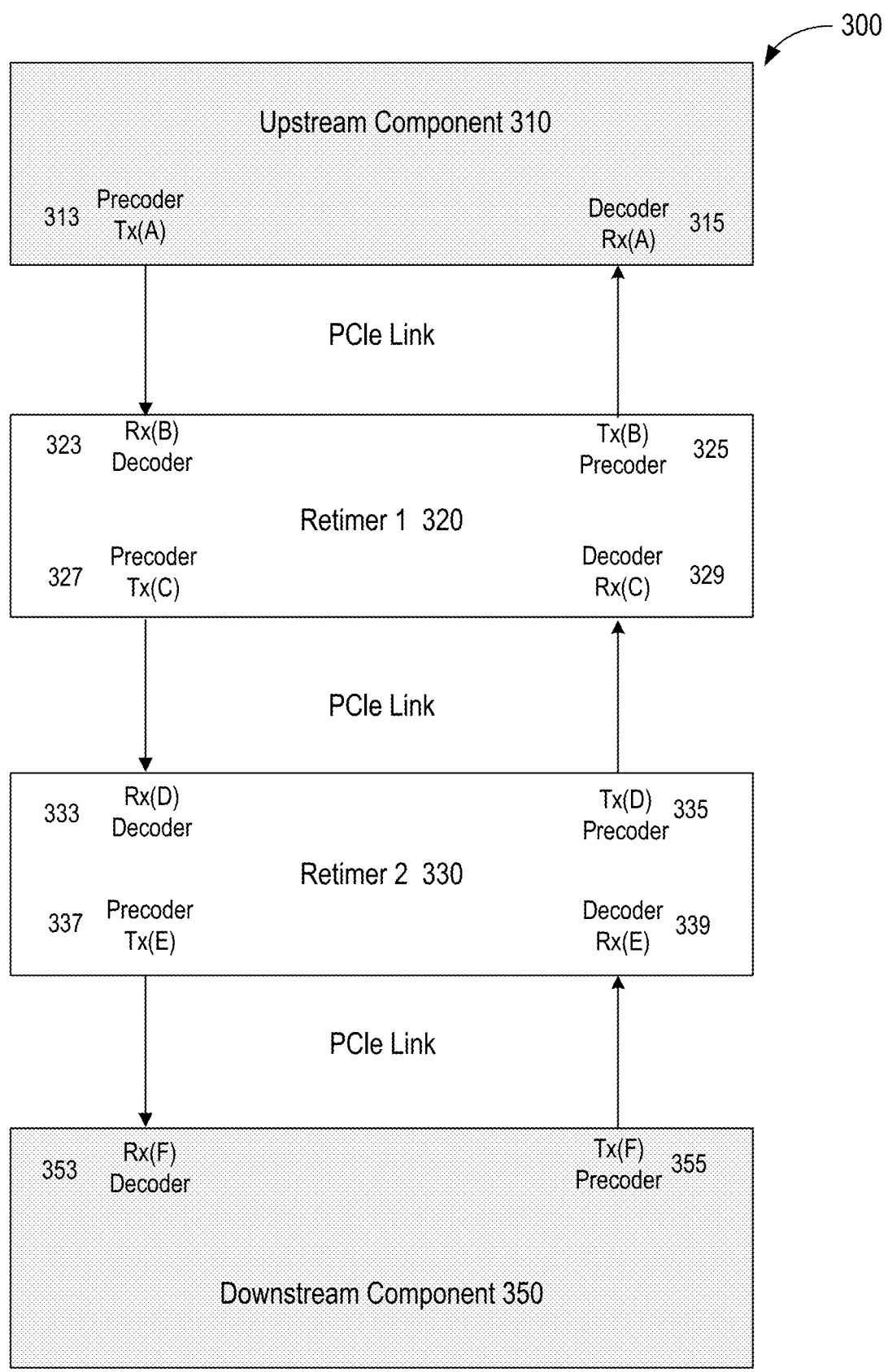
FIG. 3 is a block diagram of an example upstream component and an example downstream component, with two retimers between them, all connected by individual PCIe links, in accordance with various embodiments.

FIG. 1 is a block diagram of two example devices connected by an example serial communications link, in accordance with various embodiments. As next described, they are both transceivers, and thus each have a receiver and a transmitter, and each receiver, on each device, may separately request precoding for its link, in accordance with various embodiments. Each receiver, no matter on which device, is thus "downlink" from the transmitter on the other device, and thus "uplink" and "downlink" are relative terms. With reference to FIG. 1, there is shown device 1 101 and device 2 110. Device 1 includes Tx(A) 120, which further includes a precoder 121, and Rx(A) 125, which further includes a decoder 126. Device 2 110 includes Rx(B) 130, which further includes a decoder 131, and Tx(B) 135, which further includes a precoder 136. Device 1 101 and device 2 110 are connected over a serial communications link 140. The fact that there are two connected devices shown in FIG. 1 is illustrative. In general, there may be several intermediate devices connected in between an ultimate upstream device, such as device 1, and an ultimate downstream device, such as device 2, and each device may have a Rx and a Tx respectively connected to a Tx and Rx of an adjacent device over the respective serial communications links. An example of this is shown in FIG. 3, described below, where there are two retiming devices between an upstream component and a downstream component, and each of the four devices overall is connected to at least one adjacent device over a PCIe link (the two timers, being intermediate devices, are each connected to two adjacent devices).

Continuing with reference to FIG. 1, Tx(A) 120 is connected across serial communications link 141 to Rx(B) 130, and Tx(B) 135 is connected across serial communications link 143 to Rx(A) 120. For data transmissions between either Tx and its linked Rx, the Rx may, in embodiments, request precoding.

In embodiments, precoding is only implemented when needed, while at the same time backwards compatibility and existing encoding and link training flows are preserved. In embodiments, for a PCIe serial communications link, existing PCIe 128b/130b encoding may continue to be utilized.

In embodiments, when precoding is implemented, only scrambled data bits are precoded. Thus, in embodiments, when enabled, precoding is performed at the output of a scrambler on the transmitting device, and decoding is performed at the input of a descrambler on a corresponding receiving device. In embodiments, in similar fashion as to how the scrambler and descrambler are reset, precoding may also be reset (e.g., turned off) with an electric idle exit ordered set (EIEOS) sent by the downlink Rx. In embodiments, the decision to precode may, for example, be made by each receiver (Rx) independently, depending on its Rx DFE set-up, during a transmitter (Tx) equalization phase (e.g., for PCIe, Phase 2 for an upstream port/pseudo-port and Phase 3 for a downstream port/pseudo-port). Some serial communications links, such as PCIe for example, allow for a link between two devices to be formed from multiple Lanes (1, 2, 4, 8, or 16) depending on the bandwidth need. Thus, for the topology of FIG. 1, each of links 141 and 143 may comprise multiple lanes, and, as to each lane, or as to the link as a whole, precoding may or may not be turned on.

Figure 2:
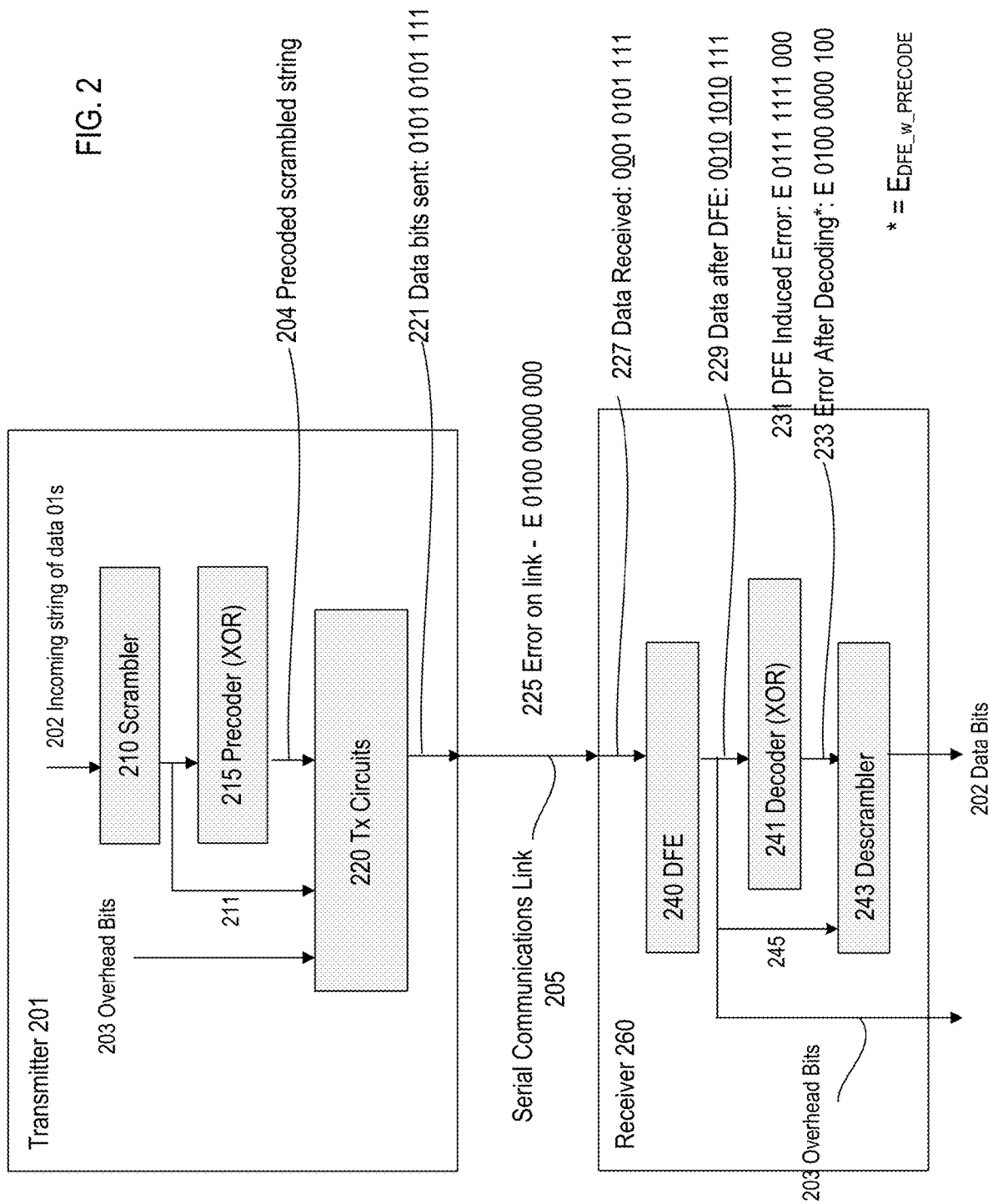
FIG. 2 illustrates example data bits sent from a transmitter to a receiver across an example serial communications link, and as processed in an example receiver, in accordance with various embodiments.

FIG. 2 illustrates example data bits sent from a transmitter to a receiver across an example serial link, and as processed in an example receiver, in accordance with various embodiments. Prior to further describing the devices and their components illustrated in FIG. 2, the problem that is addressed by precoding in accordance with various embodiments will first be described. As an example, it is assumed that a clocklike pattern (alternating 1s and 0s) is transmitted from a receiver to a transmitter across a serial communications link. For example, the data bits as sent from the Tx are Data Sent="0101 0101 111". It is further assumed that the error E on the serial communications link is $E_{LINK}$="0$\underline{1}$00 0000 000", where a "1" means an erroneous bit (error bit underlined). Thus, given the error on the link $E_{LINK}$, which flips the second bit, the data received at the Rx is Data Received="0$\underline{0}$01 0101 111", which is the original data as sent, with the second bit flipped (indicated by underline). However, in some DFE set-ups, such as, for example, those with a high H1/H0 ratio, the DFE set-up may have an adverse effect on this type of alternating bit stream, where the data after DFE="0$\underline{010}$ $\underline{1010}$ 111" (incorrect bits underlined), which is significantly different than Data Sent="0101 0101 111" and the single bit flip described above. In this example set-up the DFE has this effect due to its data-dependent behavior, where neighboring bits (after error) have a disproportionate effect and the error burst continues, assuming a clock like data pattern. Thus, the error induced by the DFE is a flip of bits 2-7, or $E_{DFE}$="0$\underline{111}$ $\underline{1111}$ 000". These example values are summarized as follows:

| Data Sent: | 0101 0101 111 |
|---|---|
| Data Received: | 0$\underline{0}$ 01 0101 111 (erroneous bits underlined) |
| Data After DFE: | 0$\underline{010}$ $\underline{1010}$ 111 (erroneous bits underlined) |
| $E_{DFE}$ = | 0111 1111 000 |

Thus, the DFE induces significant error for data bit patterns where 1s and 0s alternate. In embodiments, this effect of the DFE is minimized by precoding the data bits before they are sent, and decoding them after they are received. As noted above, in embodiments only scrambled data bits are precoded. Thus, in a Tx, precoding occurs after scrambling, and in the corresponding Rx, decoding occurs prior to descrambling. This is next described in connection with FIG. 2, which illustrates an example receiver and transmitter, connected over a serial communications link, according to various embodiments.

With reference to FIG. 2, there is shown transmitter 201, which includes scrambler 210, precoder 215 and Tx circuits 220. As shown, an input to transmitter 201 is an incoming string of data bits 202. Transmitter 201 also sends overhead bits 203 to its downlink receiver 260 in the process of transmission. The incoming string of data bits 202 is of an alternating 1010101010 pattern, precisely the type of bit pattern that is most susceptible to DFE induced errors, as noted above. Transmitter 201 is connected over serial communications link 205, to receiver 260. At the output of scrambler 210, there are two possible data paths. One that goes through precoder 215, which precodes the data bits, for example by an XOR function applied to each bit and the one just before it, and another bypass data path 211, where data bits, once scrambled, are transmitted by Tx circuits 220 without being first precoded. It is noted that path 211 is a logical path, and the same functionality may, in embodiments, be effected by having data pass through a precoder without any precoding occurring, as opposed to an actual bypass data pathway.

It is noted that in the example of FIG. 2, receiver 260 has requested that transmitter 201 turn on precoding, so incoming data bits 202 are precoded at precoder 215, following being scrambled at scrambler 210, to generate precoded scrambled string 204, which is then transmitted to receiver 260. As an example, and for ease of comparison, the same data bits 221 are sent as was described in the non-precoding example provided above, namely "0101 0101 111."

Data bits 221 encounter the same channel error over serial communications link 205 as was described above, and this error is, as noted above, $E_{LINK}$="010 0000 000." Thus, data received 227, at receiver 260, is "0001 0101 111", which has the second bit flipped. At receiver 260, data received 227 is processed by DFE 240, which, as described above, induces error in this type of alternating bit sequence. Thus, the data after DFE 229 is "0010 1010 111", now with seven errors. As shown, the DFE error function $E_{DFE}$="0111 1111 000", showing the seven errors. However, because receiver 260 requested precoding, following processing by DFE 240, data bits after DFE 229 are decoded in decoder 241. In embodiments, decoder 241 applies the XOR function to each received bit with a bit received just before it.

Because the decoder may not be needed, e.g., when the incoming data bits from transmitter 201 have not been precoded, data after DFE 229 may bypass decoder 241, and be input directly to descrambler 243 via bypass pathway 245. As noted above for bypass pathway 211, path 245 is a logical pathway, and the same functionality may, in embodiments, be effected by simply having data pass through decoder 241 without any decoding occurring. Because overhead bits 203 are neither scrambled nor decoded, they are simply output following equalization at DFE 240, as shown.

Continuing with reference to FIG. 2, when the data bits are decoded following equalization, in accordance with various embodiments, the error induced by DFE 240 is significantly reduced. Thus, as shown in FIG. 2, the error after decoding is $E_{DFE\_W\_PRECODE}$=0100 0000 100, where now the sequential string of seven errors of $E_{DFE}$ (without precoding) has been reduced to one error at the beginning ($2^{nd}$ bit) of the sequential string, and one error at its end ($9^{th}$ bit). In this example, from an original sequence of sent data bits containing an initial 8 clock pattern bits (0101 0101 . . . ), by using precoding and decoding, 7 errors of $E_{DFE}$ have been reduced to 2 errors of $E_{DFE\_W\_PRECODE}$.

These example values are summarized as follows:

| | |
|---|---|
| Data Sent: | 0101 0101 111 |
| $E_{WIRE}$: | 0100 0000 000 (a 1 indicates an error) |
| Data Received: | 0<u>0</u>01 0101 111 (erroneous bits underlined) |
| Data After DFE: | 0<u>010</u> <u>1010</u> 111 (erroneous bits underlined) |
| $E_{DFE}$ = | 0111 1111 000 (a 1 indicates an error) |
| $E_{DFE\_W\_PRECODE}$ = | 0100 0000 100 (a 1 indicates an error) |

Following decoding at decoder 241, in embodiments, the now decoded bits are input to descrambler 243, which outputs the original data bits 202. After decoding, the bits pass through descrambler 243, after which, in embodiments, cyclic redundancy checking (CRC) is applied for error detection.

FIG. 3 is a block diagram of an example platform 300, that includes an upstream component and a downstream component, with two retimers between them, all connected by individual PCIe links, in accordance with various embodiments. Platform 300 is thus a more complex platform than that shown in FIG. 1. With reference to FIG. 3, each of the four devices are connected to either one or two adjacent devices across a PCIe link. Thus, upstream component 310, being only connected to a single downstream device, has one transmitter Tx(A) 313 and one receiver Rx(A) 315. In the example platform of FIG. 3, each Rx includes a decoder, and each Tx includes a precoder. For convenience, the precoder and decoder are not separately indexed, as they are parts of their respective Tx or Rx, as the case may be. In alternate platforms according to various embodiments, there may be more, or less, intermediate devices connected between an upstream component and a downstream component.

Continuing with reference to FIG. 3, Retimer 1 320 is the next downlink device from upstream component 310. Retimer 1 320 is also connected to a further downlink device, Retimer 2 330, over PCIe links. Thus, Retimer 1 320 has one Rx/Tx pair facing upstream component 310, namely Rx(B) 323 and Tx(B) 325, and another Rx/Tx pair facing Retimer 2 330, namely Tx(C) 327 and Rx(C) 329, all connected over PCIe links.

The next device downlink from Retimer 1 320 is Retimer 2 330. Retimer 2 330 has one Rx/Tx pair facing Retimer 1 320, which is uplink from it, and this pair includes Rx(D) 333 and Tx(D) 335. Retimer 2 330 also has another Rx/Tx pair facing downstream component 350, namely Tx(E) 337 and Rx(E) 339, all connected over PCIe links Finally, at the downlink end of platform 300 is downstream component 350. It is connected only to the last intermediate device, Retimer 2 330, and downstream component 350 thus has one Rx/Tx pair, facing Retimer 2 330, namely Rx(F) 353 and Tx(F) 355.

In embodiments, on a platform such as that shown in FIG. 3, as to each PCIe link between any two devices, a lane may or may not have precoding turned on depending on the Rx DFE set up for each of the six Receivers Rx(A) 315 through Rx(F)) 353. In embodiments, this allows for maximum flexibility on a per-lane and sub-link basis, as may be determined by a given Rx based on the equalization settings. However, in alternate embodiments, other optimized set-ups are possible. For example, a device or component may decide to always set-up precoding, on all of its receivers, even before arriving at a PCIe $5^{th}$ generation (Gen 5) data rate. Or, for example, a given platform, such as platform 300 of FIG. 3, may be constrained so that only the upstream or downstream ports can request precoding. Thus, with reference to FIG. 3, under such a rule, only Rx(A) 315 and Rx(F) 353 would be able to request precoding, from their connected transmitters, Tx(B) 325, and Tx(E) 337.

As noted, in embodiments, none of the unscrambled bits, such as, for example, synchronization header (sync hdr), and most ordered sets (OSs), are precoded. With the precoding of scrambled bits, the only other exposure for a PCIe link are the skip (SKP) OSs and the control SKP OSs, which have clock pattern data, such as, for example, AA_AA_AA_AA_ . . . , and which are not scrambled. SKP OSs are used in the PCIe protocol to compensate for differences in frequencies between bit rates at two ends of a link. The receiver physical layer logical sub-block is to include elastic buffers which perform this compensation, and the interval between SKP OS transmissions is derived from the absolute value of the Tx and Rx clock frequency differences. Thus, in embodiments, these OSes may be changed to something different than currently used, but still unscrambled, for PCIe Gen 5 and above transmissions, while maintaining the property of having a hamming distance of 4 or more for the $1^{st}$ symbol across all Ordered Sets to preserve the triple bit flip detection guarantee. For example, a sequence such as 87_87_87_87 . . . satisfies these constraints, and, in embodiments, may be used. Alternatively, for example, the sequence 78_78_78_78 . . . may also be used. In embodiments, this mitigates the risk of clock pattern data causing a single bit flip to a burst error with some DFE set-ups. In embodiments, this change may be implemented for any Gen 5 data rate, to keep things simple.

It is noted that the rationale for precoding only scrambled bits is that those bits get through the CRC and may cause data corruption. Thus, in embodiments, PCIe sync hdr bits are not scrambled, and thus not precoded. Even though these (two) bits are either 01b or 10b (which is clearly an alternating "clock type" bit pattern), they are protected by either a preceding End Data Stream (EDS) framing token or a Start Data Stream (SDS) Ordered Set (OS). Thus, a given receiver knows exactly what sync hdr to expect even before it arrives. In PCIe, for example, the OSs that are not scrambled are done so for specific reasons. In order to preserve those reasons, as well as to avoid complexity, in embodiments, they are not precoded. For example, a low frequency clock pattern in Electrical Idle Exit OS (EIEOS) is used to cause an exit from electrical idle. If precoding were applied to the OS, it would remove that property. Thus, during link training, a PCIe system relies on multiple OSs consecutively matching. That offers adequate protection, when combined with the fact that the unscrambled ones do not have any clock pattern, that is, after a new encoding for the SKP OS is used, as next described.

Figure 4:
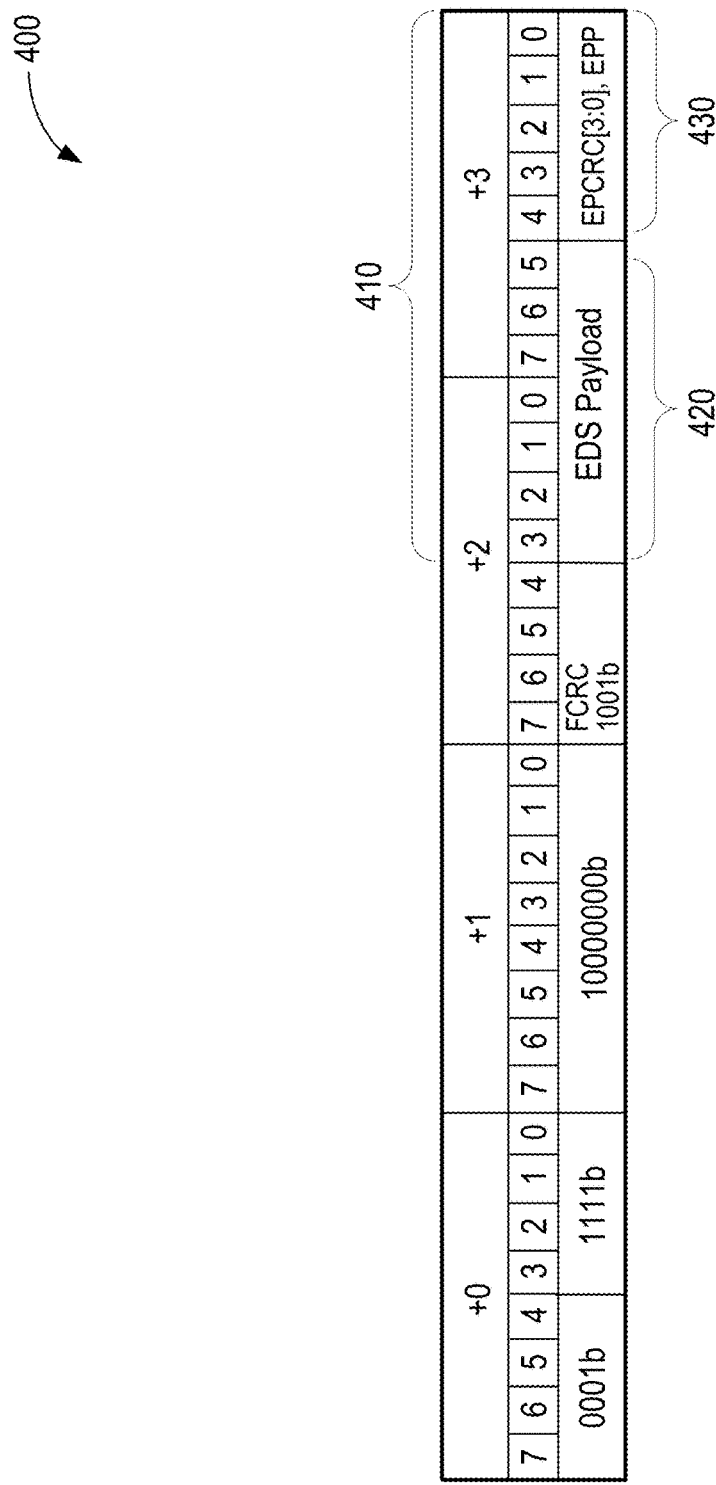
FIG. 4 illustrates a modified PCIe end-of-data-stream (EDS) token, in accordance with various embodiments.

In order to further protect an entire OS from aliasing during a data stream, in embodiments, an EDS token is modified as shown in FIG. 4, as regards newly defined bits 410, comprising newly defined fields 420 and 430. Previously, these bits are "reserved" under the current PCIe protocol. It is noted that there are three possible OSs that may be received either during a data stream or just at the end of a data stream. These include SKP OS, EIEOS, and electrical idle OS (EIOS). In embodiments, a new 7-bit EDS payload 420 is used, which is protected by a 4-bit CRC EDS P or "EP" CRC, and thus "EPCRC", and a 1-bit parity (EPP), collectively 430. In embodiments, the EPCRC uses an identical equation to that of FCRC, while the EPP is a bit-wise XOR of the 7-bit payload and the 4-bit EPCRC. Table 1 defines an example 7-bit EDS payload encoding, it being understood that alternate encodings are feasible.

TABLE 1

| Encoded value of EDS Payload[6:0] | EDS Payload [6:0] Value |
|---|---|
| 0000_01b | Following OS is SKP OS (or Control SKP OS) |
| 0000_10b | Following OS is EIEOS |
| 0000_11b | Following OS is EIOS |
| Rest | Reserved for future use |

In embodiments, a receiver may request that precoding be turned on by the transmitter either before entering a Gen 5 data rate, e.g., while transmissions on the PCIe bus are using a lower data rate, or, in embodiments, the receiver may make a request during equalization (e.g., phase 2 or phase 3, depending on whether it is an upstream or downstream port or pseudo-port).

In embodiments, if the precoding request is made during equalization, the transmitter may, in response, signal to a requesting receiver that precoding has been turned on. This signaling may use a new training set 1 (TS1) OS that differs from the standard TS1 OS in its $1^{st}$ Symbol (e.g., D2 vs 1E). Or, for example, in alternate embodiments, a bit in the TS1 OS may be used to indicate that precoding has been turned on, and, as a result, the requesting receiver may look for the precoded bit stream after receiving an EIEOS, and after allowing for a reasonable time for the equalization request to be applied.

Table 2 below illustrates how, in embodiments, an example precoding request may be made by a receiver (via Symbol 7, bit 6 of the TS1 OS), and may be indicated as having been applied by the corresponding transmitter (via Symbol 8, bit 6 of the TS1 OS). Thus, Bit 6, Symbol 7 below is where a receiver requests its transmitter to turn pre-coding on and bit 6, Symbol 8 is the acknowledgement of the request from the transmitter of the request.

TABLE 2

| TS1 OS, Symbol 7 | When operating at 2.5 or 5.0 GT/s: TS1 Identifier. Encoded as D10.2 (4 Ah). When operating at 8.0 GT/s: Bit 5:0 - FS when the EC field of Symbol 6 is 01b (see Section 4.2.3.1). Otherwise, Pre-cursor Coefficient. Bit 6 - Turn on precoding (as a request) Bit 7 - Reserved. |
|---|---|
| TS1 OS, Symbol 8 | When operating at 2.5 or 5.0 GT/s: TS1 Identifier. Encoded as D10.2 (4 Ah). When operating at 8.0 GT/s: Bit 5:0 - LF when the EC field of Symbol 6 is 01b (see Section 4.2.3.1). Otherwise, Cursor Coefficient. Bit 6 - Precoding turned on in Tx (as a status) Bit 7 - Reserved. |

Figure 5:
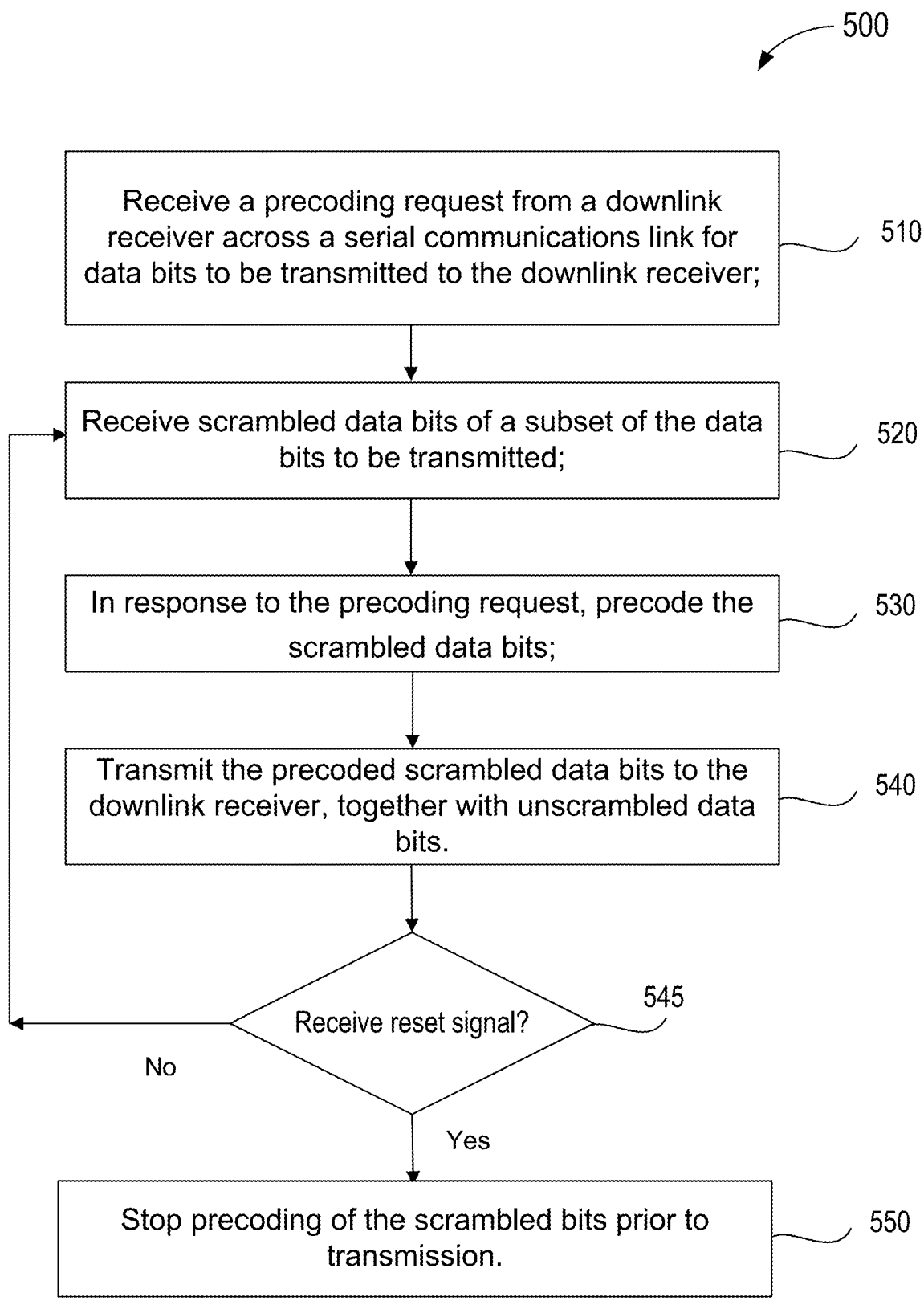
FIG. 5 illustrates an overview of the operational flow of a process for receiving a precoding request from a downlink receiver, and precoding scrambled data bits in response to the request, in accordance with various embodiments.

Referring now to FIG. 5, an overview of the operational flow of a process 500 for receiving a precoding request from a downlink receiver, and precoding scrambled data bits in response to the request, prior to transmitting them, in accordance with various embodiments, is presented. Process 500 may be performed by a transmitter of an uplink device connected to a receiver of a downlink device over a serial communications link, such as device 1 110, of FIG. 1, transmitter 201 of FIG. 2, each as described above. For example, the serial communications link 140 of FIG. 1, or 205 of FIG. 2, may be a PCIe link. Or, for example, process 500 may be performed by any or all of Tx(A), Tx(B), Tx(C), Tx(D), Tx(E) or Tx(F), which are, respectively, transmitter portions of an upstream component 310, a downstream component 380, or intermediate retimers 320 and 330, all connected via PCIe links, as shown in FIG. 3 and described above. Process 500 may include blocks 510 through 550. In alternate embodiments, process 500 may have more or less operations, and some of the operations may be performed in different order.

Process 500 begins at block 510, where an uplink transmitter connected across a serial communications link to a downlink receiver receives a precoding request from the downlink receiver across the link. The precoding request is for data bits to be transmitted by the downlink receiver. From block 510, process 500 proceeds to block 520, where the transmitter receives scrambled data bits of a subset of the bits to be transmitted. For example, as shown in FIG. 2, in the PCIe protocol, only data bits are scrambled. Overhead bits, such as, for example, training sets or other communications signaling bits, are not scrambled. In embodiments, a transmitter only precodes the scrambled data bits. From block 520, process 500 proceeds to block 530, where, in response to the precoding request, the transmitter precodes the scrambled data bits. For example, the transmitter applies an XOR function to each bit and the bit just before it.

From block 530, process 500 proceeds to block 540, where the transmitter transmits the precoded scrambled bits to the downlink receiver, together with unscrambled data bits, such as, for example, signaling bits, such as OSs, including SKP OSs and control SKP OSs, as described above. From block 540, process 500 moves to query block 545, where it determines if the transmitter has received a reset signal form the receiver, which is a request to stop the precoding then in place. For example, the reset signal may be an EIEOS, as described above. If query block 545 returns "Yes", and thus a reset signal has been received, then process 500 moves to block 550, where the transmitter stops precoding of the scrambled bits prior to transmission. On the other hand, if query block 545 returns "No", then process 500 returns to block 520, and continues to precode received scrambled bits, as the original precoding request remains in force.

Figure 6:
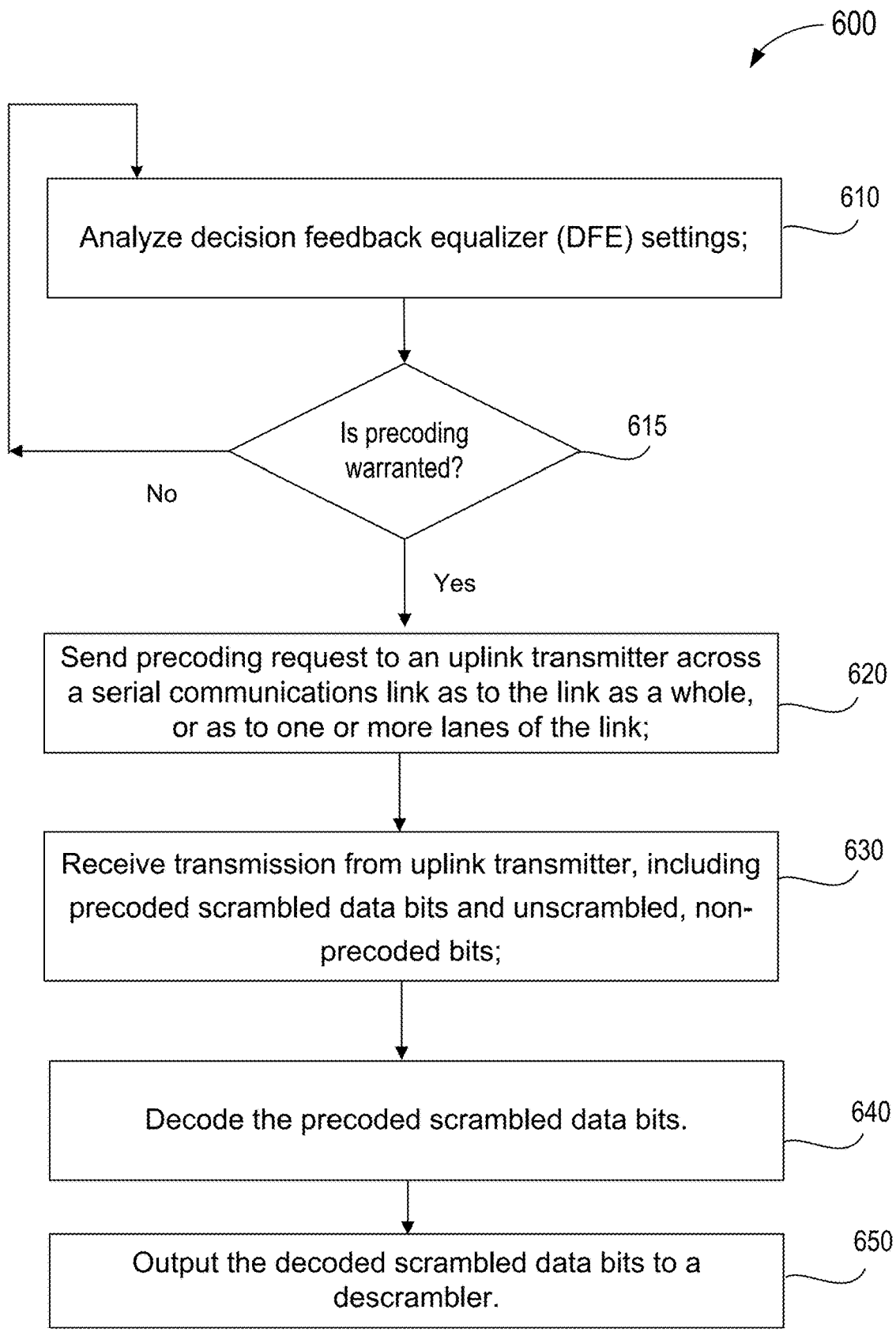
FIG. 6 illustrates an overview of the operational flow of a process for analyzing DFE settings and sending a precoding request to an uplink transmitter across a PCIe link, in accordance with various embodiments.

Referring now to FIG. 6, an overview of the operational flow of a process 600 for analyzing DFE settings and sending a precoding request to an uplink transmitter across a serial communications link, in accordance with various embodiments, is presented. Process 600 may be performed by a receiver of a downlink device connected to a transmitter of an uplink device over a serial communications link, such as device 2 110, of FIG. 1, receiver 260 of FIG. 2, each as described above. For example, the serial communications link may be a PCIe link. Or, for example, process 600 may be performed by any or all of Rx(A), Rx(B), Rx(C), Rx(D), Rx(E) or Rx(F), which are receiver portions of an upstream component 310, a downstream component 380, or intermediate retimers 320 and 330, all connected via PCIe links, as shown in FIG. 3 and described above. Process 600 may include blocks 610 through 650. In alternate embodiments, process 600 may have more or less operations, and some of the operations may be performed in different order.

Process 600 begins at block 610, where a receiver analyzes its DFE settings. For example, the receiver may obtain the H1 value used by its DFE, and may further consider that value in light of the data rate. In embodiments, the receiver decides to make a precoding request before normal Gen 5 data exchange happens. Thus, in embodiment, it has to assume the worst; i.e., that there will be long runs of 1s and 0s and bit flips may happen, and it does this before it goes to a Gen 5 rate, either during an equalization phase in Gen 5, or even before getting to Gen 5. From block 610, process 600 proceeds to query block 615, where the receiver determines if, given the DFE settings, and any other factors it has considered, precoding is warranted. For example, the receiver may determine that given the H1 value of the DFE, and the data rate, H1 is high enough to warrant precoding by the transmitter of the uplink device. If query block 615 returns a "No", the process 600 returns to block 610, and repeats another loop of process 600, there being no need to request precoding form the uplink transmitter at this time. However, if "Yes" is returned at query block 615, process 600 proceeds to block 620, where the receiver sends a precoding request to the uplink transmitter on the uplink side of the link. In embodiments, the precoding request may be for the entire link connecting the receiver with the uplink transmitter, or, for example, the request may be for one or more specific lanes of the link, as described above. From block 620, process 600 proceeds to block 630, where the receiver receives a transmission across the link from the uplink transmitter. The transmission includes both precoded scrambled data bits and unscrambled, non-precoded bits, such as training sets or other overhead data. As described above, the precoded bits may be precoded at the output of a scrambler on the transmitter, and the precoding may be to XOR each transmitted data bit with another data bit transmitted just before it.

From block 630, process 600 proceeds to block 640, where the receiver decodes the precoded scrambled bits, using a decoder, such as decoder 126 or 131 of FIG. 1, 241 of FIG. 2, or as is shown as part of each of receivers Rx(A), Rx(B), Rx(C), Rx(D), Rx(E) or Rx(F), in FIG. 3. In embodiments, the decoder performs the inverse of the precoding operation, which, in the case of XOR precoding, is also an XOR operation of each bit with the one just prior to it.

From block 640, process 600 proceeds to block 650, where the receiver outputs the precoded scrambled bits to a descrambler.

Figure 7:
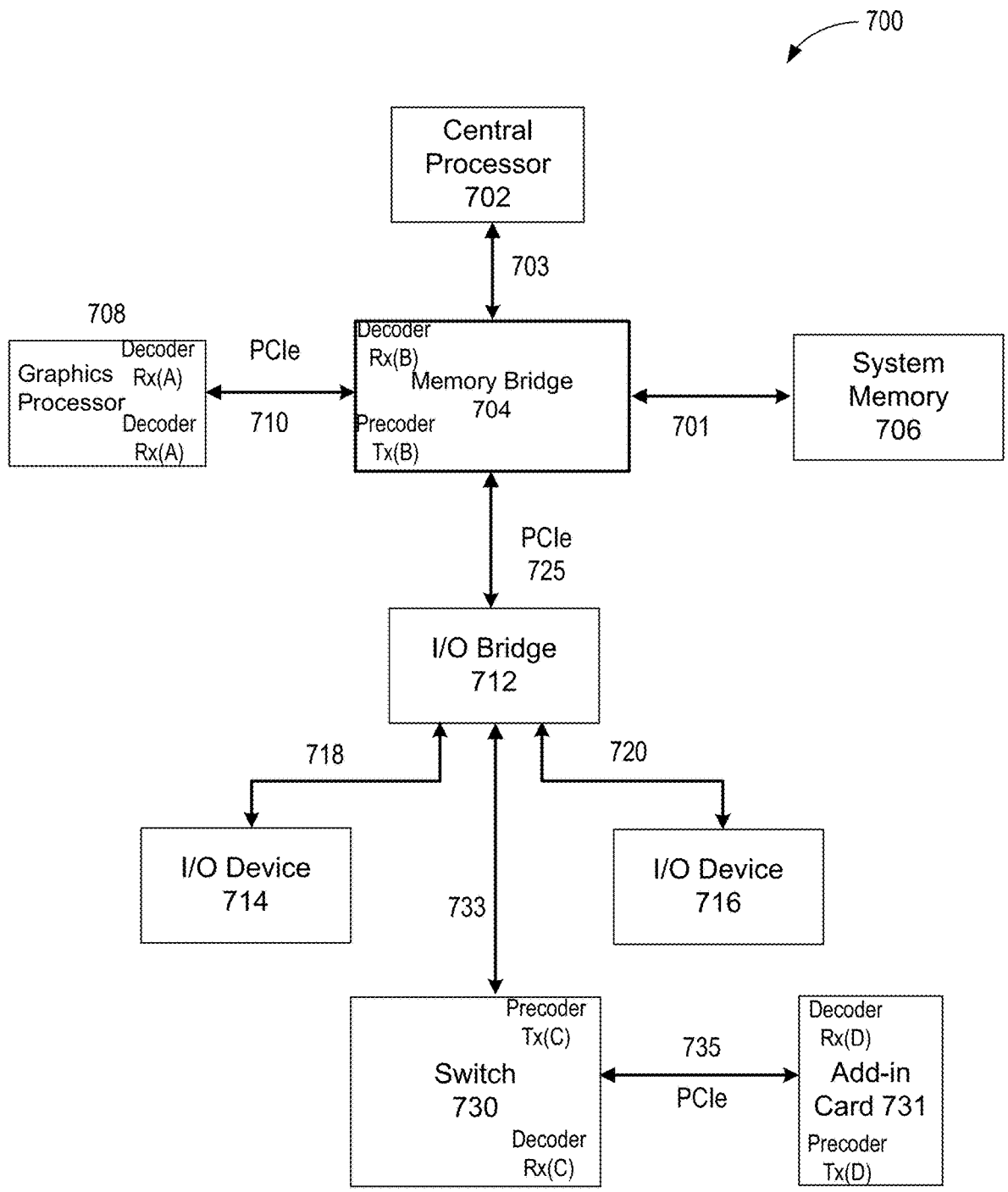
FIG. 7 illustrates a block diagram of a computer device suitable for practicing the present disclosure, in accordance with various embodiments.

Referring now to FIG. 7 wherein a block diagram of a computer device 700 suitable for practicing the present disclosure, in accordance with various embodiments, is illustrated. The computer device includes central processor 702, and a memory bridge 704. Central processor 702 is connected to memory bridge 704 via interconnect 703. Computer device 700 also includes a processor-memory interconnect 701 for communication between different components coupled to interconnect 701, such as processors, bridges, memory devices, etc. Processor-memory interconnect 701 may include specific interconnect lines that send arbitration, address, data, and control information (not shown). In some embodiments, central processor 702 is coupled to processor-memory interconnect 701 through processor-memory bridge 704. In other embodiments, there may be multiple central processors coupled to processor-memory interconnect 701 (the multiple processors are not shown in this figure).

Processor-memory interconnect 701 provides central processor 702 and other devices access to the memory subsystem. In some embodiments, a system memory controller that controls access to system memory 706 is located on the same chip as processor-memory bridge 704. In other embodiments, a system memory controller may be located on the same chip as central processor 702. Information, instructions, and other data may be stored in system memory 106 for use by central processor 702 as well as many other potential devices. In some embodiments, graphics processor 708 is coupled to processor-memory bridge 704 through a graphics interconnect 710, which, in some embodiments, as shown, is a PCIe x16 interconnect. Thus, in such embodiments, each of graphics processor 708 and memory bridge 704 have a precoder provided in their respective transmitters, and a decoder provided in their respective receivers, as shown.

I/O devices 714 and 716 are coupled to system I/O interconnects 718 and 720, and to processor-memory interconnect 701 through I/O bridge 712 and memory bridge 704. I/O Bridge 712 is coupled to processor-memory interconnect 701 through memory bridge 704 and system I/O interconnects 718 and 720 to provide an interface for an I/O device to communicate with a device on the processor-memory interconnect 701. As shown, PCIe link 725 connects I/O bridge 712 to memory bridge 704, and thus I/O bridge 712 is also provided with a precoder in its transmitter, as well as a decoder in its receiver (not shown).

Additionally, switch 730 is connected to I/O bridge 712, via interconnect 733. Switch 730 is a PCIe device, to which add-in card 731 connects over PCIe link 735. Thus, each of switch 730 and add-in card 731 are provided with precoders in their transmitters, and decoders in their receivers, as shown.

Illustrative examples of the technologies disclosed herein are provided below. An embodiment of the technologies may include any one or more, and any combination of, the examples described below.

EXAMPLES

Example 1 is an apparatus for serial communication, comprising: a transceiver, to receive a precoding request from a downlink receiver across a serial communication link, and to transmit data bits to the downlink receiver over the serial communication link, and a precoder, coupled to the transceiver, to receive scrambled data bits of a subset of the data bits to be transmitted, from a coupled scrambler. The precoder is further, in response to the request from the downlink receiver, precode the scrambled data bits and output the precoded scrambled data bits to the transceiver, for transmission to the downlink receiver across the serial communication link together with other unscrambled data bits.

Example 2 is the apparatus of example 1, wherein the precoding request is sent from the downlink receiver during back-channel based transmitter equalization.

Example 3 is the apparatus of example 1, wherein, upon receipt of the precoding request, the transceiver is further to indicate, via a bit in a transmitted training ordered set, that precoding has been turned on.

Example 4 is the apparatus of example 1, wherein to precode the scrambled data bits includes to XOR each transmitted data bit with another data bit transmitted just before it.

Example 5 is the apparatus of example 1, further comprising the scrambler to scramble the subset of the data bits to be transmitted to generate the scrambled data bits.

Example 6 is the apparatus of example 1, wherein the transceiver transmits the precoded scrambled bits and the other unscrambled bits in a 128:2 ratio.

Example 7 is the apparatus of example 1, wherein the serial communication link comprises multiple lanes connecting the apparatus and the downlink receiver, and wherein the precoder is further to selectively implement or not implement precoding as to each lane of the serial communication link, in response to either receipt, or no receipt, by the transceiver, as the case may be, of a precoding request from the downlink receiver as to that lane.

Example 8 is the apparatus of example 1, wherein the precoder, once precoding has been requested for the serial communication link, is to continue to precode the scrambled data bits for that serial communication link, until receipt of a reset signal, from the downlink receiver, by the transceiver.

Example 9 is the apparatus of example 8, wherein the reset signal is an electric idle exit ordered set (EIEOS) signal.

Example 10 is the apparatus of example 1, wherein the precoding request indicates that precoding is to begin prior to the transceiver entering a predetermined data rate.

Example 11 is the apparatus of example 1, wherein the serial communication link is a peripheral component interconnect-express link.

Example 12 is a circuit card for computing, comprising: a transceiver to receive a precoding request from a downlink receiver external to the circuit card, across a peripheral component interconnect-express (PCIe) link; and a scrambler, to scramble a subset of a plurality of data bits to be transmitted to the downlink receiver over the PCIe link, wherein the transceiver, in response to the request from the downlink receiver, is to further: precode the scrambled data bits, and transmit the precoded scrambled data bits to the downlink receiver together with unscrambled data bits.

Example 13 is the circuit card of example 12, wherein the precoding request is sent from the downlink receiver during back-channel based transmitter equalization.

Example 14 is the circuit card example 12, wherein the transceiver is further to indicate, via a bit in a transmitted PCIe training ordered set, that precoding has been turned on.

Example 15 is the circuit card of example 12, wherein to precode the scrambled data bits includes to XOR each transmitted data bit with another bit transmitted just before it.

Example 16 is the circuit card of example 12, wherein the transceiver transmits the precoded scrambled bits and the other unscrambled bits in a 128:2 ratio.

Example 17 is the circuit card of example 12, wherein the PCIe link comprises multiple lanes connecting the transceiver and the downlink receiver, and wherein the transceiver is further to selectively implement or not implement precoding as to each lane of the PCIe link, in response to either receipt, or no receipt, by the transceiver, as the case may be, of a precoding request from the downlink receiver as to that lane.

Example 18 is the circuit card of example 12, wherein the transceiver, once precoding has been requested for the PCIe link, is to continue to precode the scrambled data bits for that PCIe link, until receipt of a reset signal from the downlink receiver by the transceiver.

Example 19 is the circuit card of example 18, wherein the reset signal is an electric idle exit ordered set (EIEOS) signal.

Example 20 is the circuit card of example 12, wherein the precoding request indicates that precoding is to begin prior to the transceiver entering a predetermined data rate.

Example 21 is a system, comprising: first circuit component having a downlink receiver to send a precoding request to an uplink transmitter of a second circuit component across a serial communication link during back-channel based transmitter equalization; and the second circuit component having the uplink transmitter, to receive the precoding request from, and transmit data bits to, the downlink receiver, across the serial communication link, wherein the transmitter scrambles a subset of data bits to be transmitted, of a pre-defined type, and wherein, in response to the request from the downlink receiver, the transmitter precodes the scrambled data bits, and transmits them to the downlink receiver, together with other unscrambled data bits, across the serial communication link.

Example 22 is the system of example 21, wherein the serial communication link comprises multiple lanes connecting the uplink transmitter and the downlink receiver, and wherein the uplink transmitter is further to selectively implement or not implement precoding as to each lane of the serial communication link, in response to either receipt, or no receipt, by the uplink transmitter, as the case may be, of a precoding request from the downlink receiver as to that lane.

Example 23 is the system of example 22, wherein the downlink receiver makes a request for precoding as to a lane, or as to the entire link, based, at least in part, on its decision feedback equalization setup.

Example 24 is the system of example 21, wherein to precode the scrambled data bits includes to XOR each transmitted data bit with another data bit transmitted just before it.

Example 25 is the system of example 21, wherein the precoding request indicates that the uplink transmitter is to begin precoding prior to transmitting at a predetermined data rate.

Example 26 is an apparatus for computing, comprising: transmitting means to receive a precoding request from a downlink receiver external to the circuit card, across a peripheral component interconnect-express (PCIe) link; and means for scrambling, to scramble a subset of a plurality of data bits to be transmitted to the downlink receiver over the PCIe link, wherein the transmitting means, further comprises means for precoding, and in response to the request from the downlink receiver, the means for precoding precodes the scrambled data bits, and the transmitting means transmits the precoded scrambled data bits to the downlink receiver together with unscrambled data bits.

Example 27 is the apparatus for computing of example 26, wherein the precoding request is sent from the downlink receiver during back-channel based transmitter equalization.

Example 28 is the apparatus for computing of example 26, wherein the transmitting means further comprises means for indicating, to indicate, via a bit in a transmitted PCIe training ordered set, that precoding has been turned on.

Example 29 is the apparatus for computing of example 26, wherein the means for precoding includes means for XORing each transmitted data bit with another bit transmitted just before it.

Example 30 is the apparatus for computing of example 26, wherein the transmitting means transmits the precoded scrambled bits and the other unscrambled bits in a 128:2 ratio.

Example 31 is a method, comprising: receiving, by a transmitter, a precoding request from a downlink receiver across a peripheral component interconnect-express (PCIe) link; scrambling a subset of a plurality of data bits to be transmitted to the downlink receiver over the PCIe link; and, in response to the request from the downlink receiver: precoding the scrambled data bits, and transmitting the precoded scrambled data bits to the downlink receiver together with unscrambled data bits.

Example 32 is the method of example 31, wherein the PCIe link comprises multiple lanes connecting the transmitter and the downlink receiver, and further comprising: selectively implementing or not implementing precoding as to each lane of the PCIe link, in response to either receiving, or not receiving, by the transmitter, as the case may be, a precoding request from the downlink receiver as to that lane.

Example 33 is the method of example 31, further comprising, once precoding has been requested for the PCIe link, precoding the scrambled data bits for that PCIe link, until receiving a reset signal from the downlink receiver.

Example 34 is the method of example 33, wherein the reset signal is an electric idle exit ordered set (EIEOS) signal.

Example 35 is the method of example 31, wherein the precoding request indicates that precoding is to begin prior to the transmitter entering a predetermined data rate.

What is claimed is:

1. An apparatus for serial communication, comprising:
a transceiver, to receive a precoding request from a downlink receiver across a serial communication link, and to transmit data bits to the downlink receiver over the serial communication link; and
a precoder, coupled to the transceiver, to:
receive scrambled data bits of a subset of the data bits to be transmitted, from a coupled scrambler; and
in response to the request from the downlink receiver, precode the scrambled data bits; and
output the precoded scrambled data bits to the transceiver, for transmission to the downlink receiver across the serial communication link together with other unscrambled data bits.

2. The apparatus of claim 1, wherein the precoding request is sent from the downlink receiver during back-channel based transmitter equalization.

3. The apparatus of claim 1, wherein, upon receipt of the precoding request, the transceiver is further to indicate, via a bit in a transmitted training ordered set, that precoding has been turned on.

4. The apparatus of claim 1, wherein to precode the scrambled data bits includes to XOR each transmitted data bit with another data bit transmitted just before it.

5. The apparatus of claim 1, further comprising the scrambler to scramble the subset of the data bits to be transmitted to generate the scrambled data bits.

6. The apparatus of claim 1, wherein the transceiver transmits the precoded scrambled bits and the other unscrambled bits in a 128:2 ratio.

7. The apparatus of claim 1, wherein the serial communication link comprises multiple lanes connecting the apparatus and the downlink receiver, and wherein the precoder is further to selectively implement or not implement precoding as to each lane of the serial communication link, in response to either receipt, or no receipt, by the transceiver, as the case may be, of a precoding request from the downlink receiver as to that lane.

8. The apparatus of claim 1, wherein the precoder, once precoding has been requested for the serial communication link, is to continue to precode the scrambled data bits for that serial communication link, until receipt of a reset signal, from the downlink receiver, by the transceiver.

9. The apparatus of claim 8, wherein the reset signal is an electric idle exit ordered set (EIEOS) signal.

10. The apparatus of claim 1, wherein the precoding request indicates that precoding is to begin prior to the transceiver entering a predetermined data rate.

11. The apparatus of claim 1, wherein the serial communication link is a peripheral component interconnect-express link.

12. A circuit card for computing, comprising:
a transceiver to receive a precoding request from a downlink receiver external to the circuit card, across a peripheral component interconnect-express (PCIe) link; and a scrambler, to scramble a subset of a plurality of data bits to be transmitted to the downlink receiver over the PCIe link, wherein the transceiver, in response to the request from the downlink receiver, is to further:

precode the scrambled data bits, and transmit the precoded scrambled data bits to the downlink receiver together with unscrambled data bits.

13. The circuit card of claim 12, wherein the precoding request is sent from the downlink receiver during back-channel based transmitter equalization.

14. The circuit card claim 12, wherein the transceiver is further to indicate, via a bit in a transmitted PCIe training ordered set, that precoding has been turned on.

15. The circuit card of claim 12, wherein to precode the scrambled data bits includes to XOR each transmitted data bit with another bit transmitted just before it.

16. The circuit card of claim 12, wherein the transceiver transmits the precoded scrambled bits and the other unscrambled bits in a 128:2 ratio.

17. The circuit card of claim 12, wherein the PCIe link comprises multiple lanes connecting the transceiver and the downlink receiver, and wherein the transceiver is further to selectively implement or not implement precoding as to each lane of the PCIe link, in response to either receipt, or no receipt, by the transceiver, as the case may be, of a precoding request from the downlink receiver as to that lane.

18. The circuit card of claim 12, wherein the transceiver, once precoding has been requested for the PCIe link, is to continue to precode the scrambled data bits for that PCIe link, until receipt of a reset signal from the downlink receiver by the transceiver.

19. The circuit card of claim 18, wherein the reset signal is an electric idle exit ordered set (EIEOS) signal.

20. The circuit card of claim 12, wherein the precoding request indicates that precoding is to begin prior to the transceiver entering a predetermined data rate.

21. A system, comprising:

first circuit component having a downlink receiver to send a precoding request to an uplink transmitter of a second circuit component across a serial communication link during back-channel based transmitter equalization; and the second circuit component having the uplink transmitter, to receive the precoding request from, and transmit data bits to, the downlink receiver, across the serial communication link, wherein the transmitter scrambles a subset of data bits to be transmitted, of a pre-defined type, and wherein, in response to the request from the downlink receiver, the transmitter precodes the scrambled data bits, and transmits them to the downlink receiver, together with other unscrambled data bits, across the serial communication link.

22. The system of claim 21, wherein the serial communication link comprises multiple lanes connecting the uplink transmitter and the downlink receiver, and wherein the uplink transmitter is further to selectively implement or not implement precoding as to each lane of the serial communication link, in response to either receipt, or no receipt, by the uplink transmitter, as the case may be, of a precoding request from the downlink receiver as to that lane.

23. The system of claim 22, wherein the downlink receiver makes a request for precoding as to a lane, or as to the entire link, based, at least in part, on its decision feedback equalization setup.

24. The system of claim 21, wherein to precode the scrambled data bits includes to XOR each transmitted data bit with another data bit transmitted just before it.

25. The system of claim 21, wherein the precoding request indicates that the uplink transmitter is to begin precoding prior to transmitting at a predetermined data rate.

* * * * *